(12) United States Patent
Jenkins et al.

(10) Patent No.: US 10,079,461 B1
(45) Date of Patent: Sep. 18, 2018

(54) REVERSIBLE PLUG

(71) Applicant: Western Digital Techologies, Inc., Irvine, CA (US)

(72) Inventors: Dean M. Jenkins, La Canada-Flintridge, CA (US); Musa I. Kakish, Anaheim, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 358 days.

(21) Appl. No.: 14/087,642

(22) Filed: Nov. 22, 2013

Related U.S. Application Data (60) Provisional application No. 61/885,870, filed on Oct. 2, 2013.

(51) Int. Cl.
*G06F 13/00* (2006.01)
*H01R 31/06* (2006.01)

(52) U.S. Cl.
CPC ..................... *H01R 31/06* (2013.01)

(58) Field of Classification Search
CPC ..................................................... H01R 31/06
See application file for complete search history.

(56) References Cited

U.S. PATENT DOCUMENTS

| | | | |
|---|---|---|---|
| 4,915,466 A | 4/1990 | Sorensen et al. | |
| 6,634,796 B2 | 10/2003 | de Jong et al. | |
| 7,311,526 B2 * | 12/2007 | Rohrbach | H01R 13/6205 439/218 |
| 7,517,222 B2 | 4/2009 | Rohrbach et al. | |
| 7,645,143 B2 | 1/2010 | Rohrbach et al. | |
| 7,901,216 B2 | 3/2011 | Rohrbach et al. | |
| 8,177,560 B2 | 5/2012 | Rohrbach et al. | |
| 2007/0202725 A1 * | 8/2007 | Teicher | H01R 27/00 439/173 |
| 2013/0108065 A1 | 5/2013 | Mullins et al. | |
| 2013/0115817 A1 | 5/2013 | Terlizzi et al. | |
| 2013/0115821 A1 * | 5/2013 | Golko | H01R 13/516 439/638 |
| 2013/0117470 A1 * | 5/2013 | Terlizzi | H01R 13/6683 710/3 |

FOREIGN PATENT DOCUMENTS

EP 0653820 1/2000

* cited by examiner

*Primary Examiner* — Henry Tsai
*Assistant Examiner* — Juanito Borromeo
(74) *Attorney, Agent, or Firm* — Chang & Hale LLP (57) ABSTRACT

A swap logic unit including a set of outputs configured to be in a first configuration or a second configuration, and control circuitry. The control circuitry is configured to connect to a swap indication contact, wherein a voltage of the swap indication contact is configured to indicate an orientation of a reversible plug in a cable unit, and configure the set of outputs in the first configuration or the second configuration based on the voltage of the swap indication contact, wherein the first configuration corresponds to a first orientation of the reversible plug and the second configuration corresponds to a second orientation of the reversible plug.

23 Claims, 7 Drawing Sheets

REVERSIBLE PLUG

CROSS-REFERENCE TO RELATED APPLICATIONS

This application claims the benefit of U.S. Provisional Application No. 61/885,870, filed on Oct. 2, 2013, entitled "REVERSIBLE CONNECTOR," which is hereby incorporated by reference in its entirety.

BACKGROUND

Conventionally, a cable was utilized to connect two electronic devices together. The cable often included a plug, which would be slid into at least one of the electronic devices. However, the plug would often fit into the electronic device in one direction. Thus, if the user inserted the plug incorrectly, the cable may not function. In addition, in some instances, the user may damage the plug. Thus, the user may spend time trying to orient the plug in the correct manner in order to slide the plug into the electronic device. This may be cumbersome if the electronic device has to be frequently disconnected.

However, when the cable is plugged into the electronic device and the cable is connected to both electronic devices, the cable may be snagged by another object. In such a case, the plug may be suddenly yanked out from the electronic device, which may damage the cable, or the electronic device. Where the plug isn't suddenly yanked out from the electronic device, one or more of the electronic devices may crash onto other objects, such as a floor. This may damage the one or more electronic devices.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
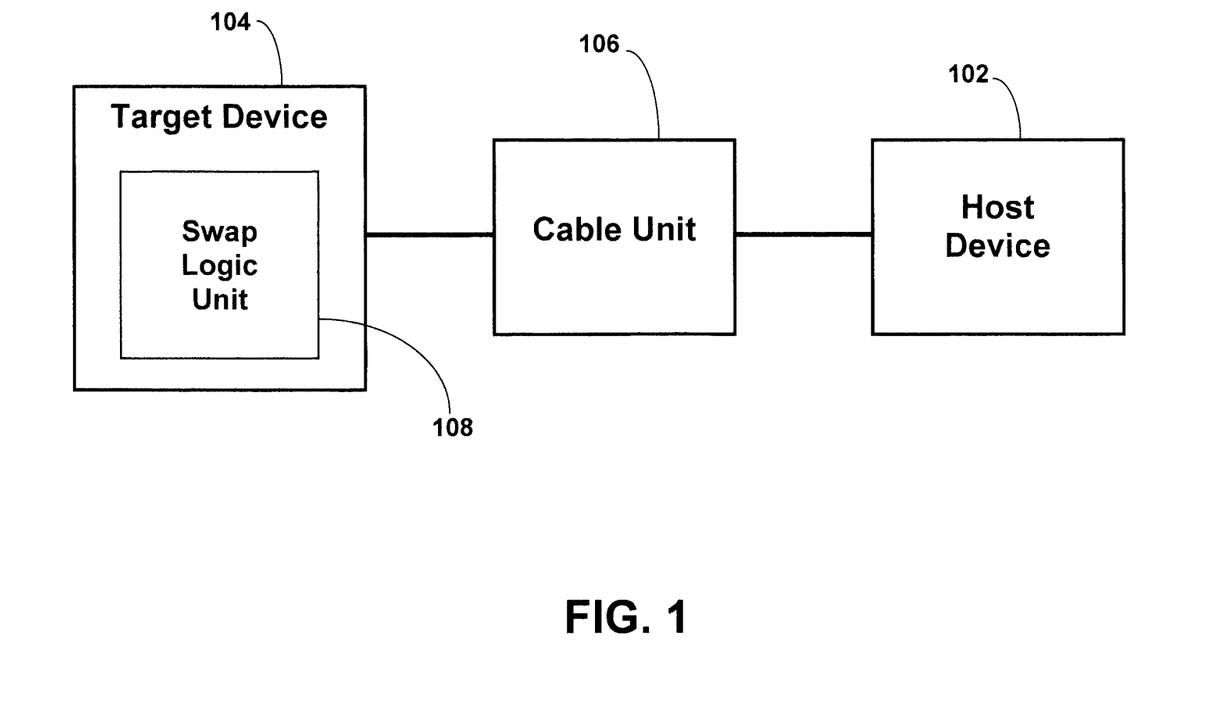
FIG. 1 depicts a cable unit connecting a host device to a target device, wherein the target device comprises a swap logic unit according to an embodiment.

In an embodiment as shown in FIG. 1, a cable unit 106 is configured to be connected between a host device 102 and a target device 104. In an embodiment, the host device 102 comprises a laptop, a computer, or other device which may be connected to the target device 104. In an embodiment, the target device 104 comprises an electronic device. For example, the electronic device can comprise a storage device or other device which may be connected to the host device 102.

In an embodiment, the target device 104 comprises a swap logic unit 108. The swap logic unit 108 can, for example, ensure that the proper signals are passed to the cable unit 106 when the cable unit 106 comprises a reversible plug, which will be described in more detail below.

Figure 2:
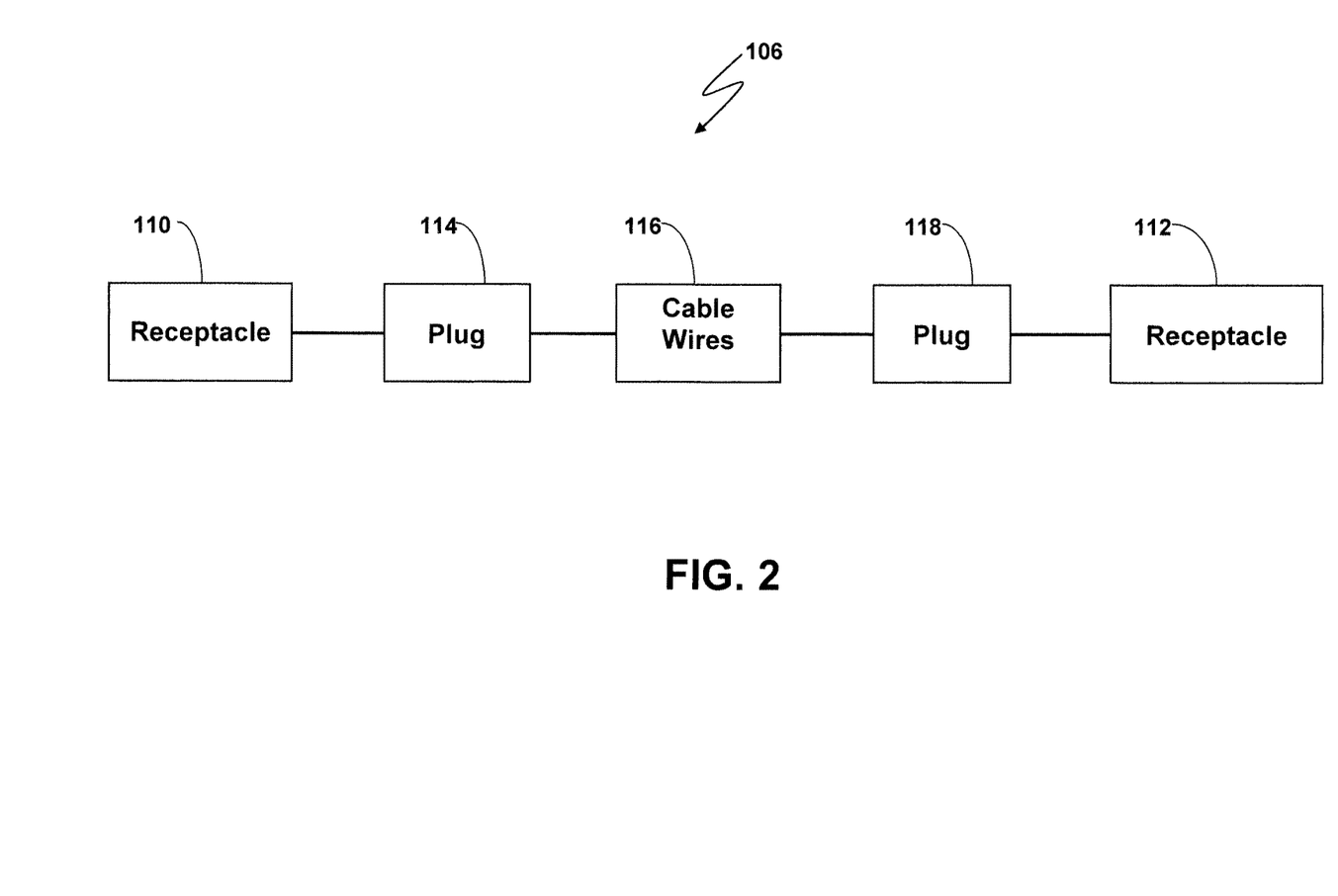
FIG. 2 depicts a cable unit connected to a receptacle for a target device and a receptacle for a host device according to an embodiment.

In the embodiment shown in FIG. 2, the target device 104 comprises a receptacle 110 while the host device 102 comprises a receptacle 112. Furthermore, the cable unit 106 comprises a plug 114, cable wires 116, and a plug 118. In an embodiment, the plug 114 comprises a reversible plug. As seen in the embodiment shown in FIG. 2, the receptacle 110 is configured to be connected to the plug 114, while the receptacle 112 is configured to be connected to the plug 118. In an embodiment, the cable wires 116 carry signals between the target device 104 and the host device 102.

Figure 3:
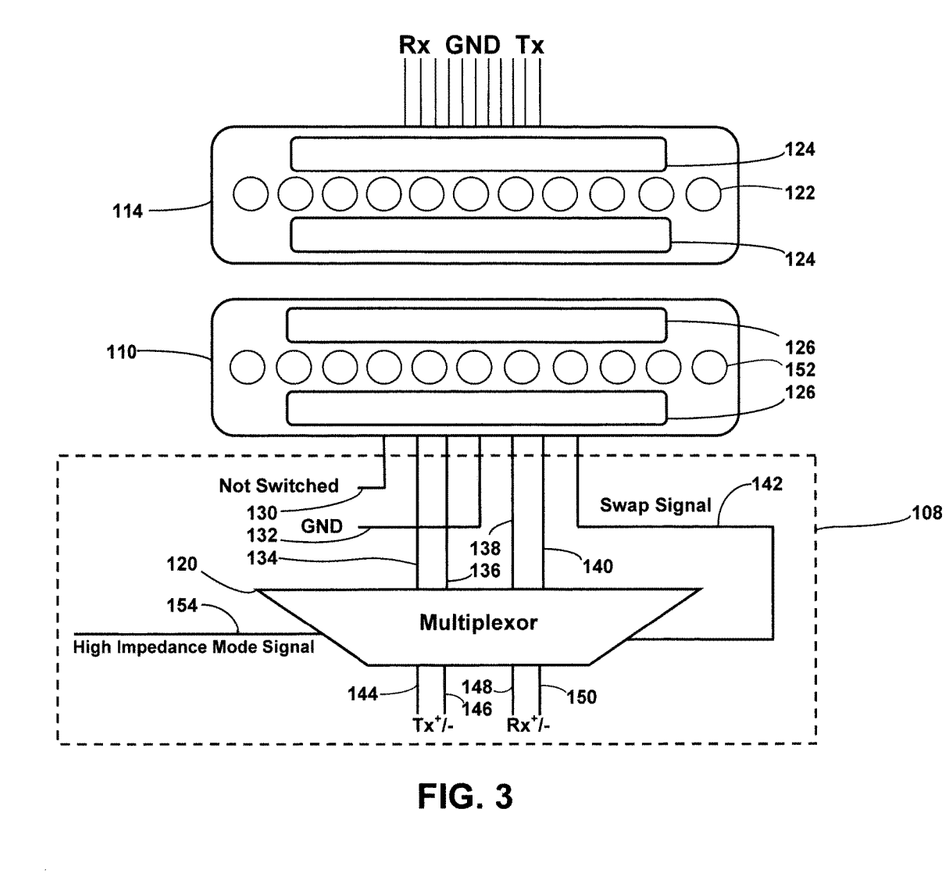
FIG. 3 depicts a plug connected to a receptacle for a target device, and a swap logic unit according to an embodiment.

In the embodiment shown in FIG. 3, the receptacle 110 is shown along with the plug 114 and the swap logic unit 108. In an embodiment, the plug 114 comprises a plug magnetic element 124, while the receptacle 110 comprises a receptacle magnetic element 126. In an embodiment, the plug magnetic element 124 comprises a magnet, while the receptacle magnetic element 126 comprises an iron unit. In an embodiment, the iron in the receptacle magnetic element 126 could comprise a shield to shield the swap logic unit 108 and/or any electronic components in the target device 104 from the magnetic interference caused by the magnet in the plug magnetic element 124.

In an embodiment, the plug magnetic element 124 can be connected to a ground voltage. In an embodiment, this can reduce a necessity for additional contacts in the plug 114 to comprise the ground voltage. This can, for example, reduce manufacturing costs.

However, in an embodiment the plug magnetic element 124 and the receptacle magnetic element 126 could be reversed. In addition, the plug magnetic element 124 and the receptacle magnetic element 126 could both comprise a magnet. In such a case, the polarity of the magnets could be such that they are opposite polarities so that they are attracted to each other.

In an embodiment, the plug magnetic element 124 and the receptacle magnetic element 126 allow the cable unit 106 to be removably connected to the target device 104. In an embodiment, the plug magnetic element 124 and the receptacle magnetic element 126 allow the cable unit 106 to be removed from the target device 104 when a force greater than a maximum force threshold is placed on the cable unit 106.

The maximum force threshold can be selected such that the target device 104 will not be damaged or severely displaced from its location when the force greater than the maximum force threshold is placed on the cable unit 106. In an embodiment, this can prevent the target device 104 from dragging the host device 102 or the target device 104 to the ground, or otherwise cause damage to the host device 102 or the target device 104. For example, damage can be prevented when the cable unit 106 is caught on something. Instead, the cable unit 106 can detach from the target device 104.

Figure 4:
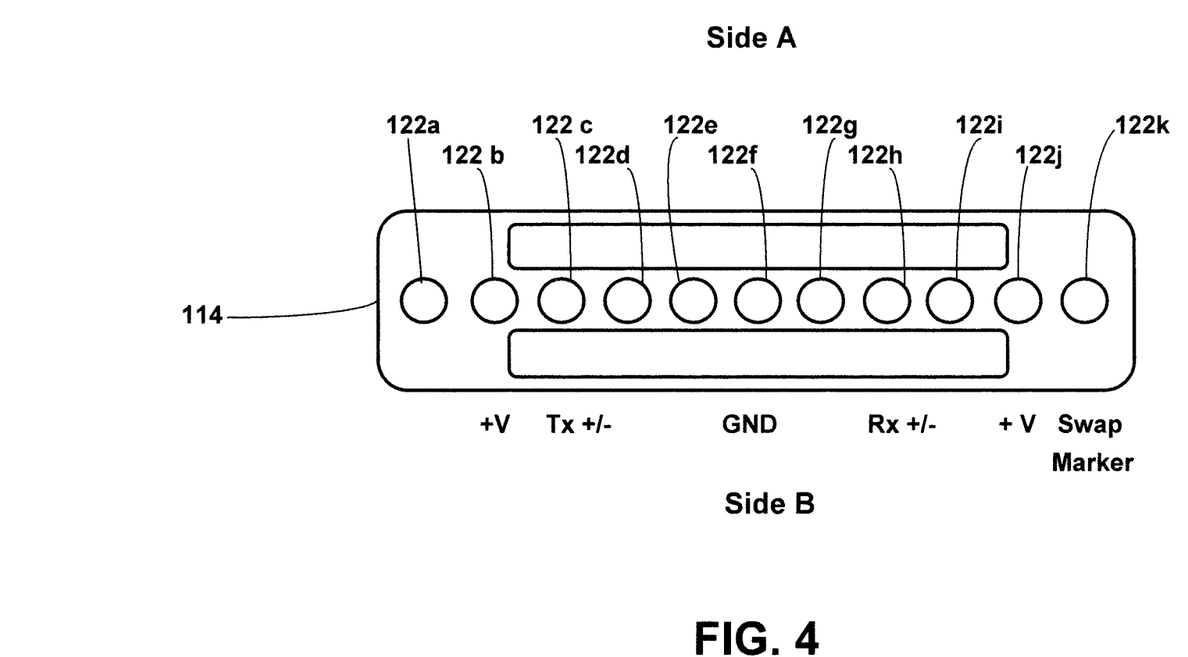
FIG. 4 depicts a plug in a first orientation according to an embodiment.

Furthermore, as can be seen in the embodiment shown in FIG. 3, the plug 114 comprises a set of plug contacts 122 while the receptacle 110 comprises a set of receptacle contacts 152. In an embodiment, the plug 114 is shown in more detail in FIGS. 4 and 5. As can be seen in FIG. 4, the plug 114 comprises the set of plug contacts 122 as shown by the indications 122a-122k. In an embodiment, the set of plug contacts 122 comprise a single row of contacts. This can, for example, reduce manufacturing costs. In an embodiment, the set of plug contacts 122 comprises an unused contact 122a, a voltage contact 122b, transmit signal contacts 122c and 122d, ground contacts 122e-122g, receive signal contacts 122h and 122i, a voltage contact 122j, and a swap marker contact 122k. Although only a certain number of contacts are depicted in the embodiment shown in FIG. 4, more or less contacts may be utilized.

In an embodiment, the location of the swap marker contact 122k indicates an orientation of the plug 114 and the set of plug contacts 122 as being in the first orientation, or a second orientation. In the embodiment shown in FIG. 4, the set of plug contacts 122 are in the first orientation as indicated by the location of Side A and Side B. In an embodiment shown in FIG. 5, in the second orientation, the plug 114 is rotated by 180° relative to the rotation of the plug 114 in the first orientation as indicated by the location of Side A and Side B. That is, in the second orientation, from left to right, the set of plug contacts 122 comprises the swap marker contact 122k, the voltage contact 122j, the receive signal contacts 122i and 122h, the ground contacts 122g-122e, the transmit signal contacts 122d and 122c, the voltage contact 122b, and the unused contact 122a. In an embodiment, the first orientation and the second orientation can be reversed.

Figure 5:
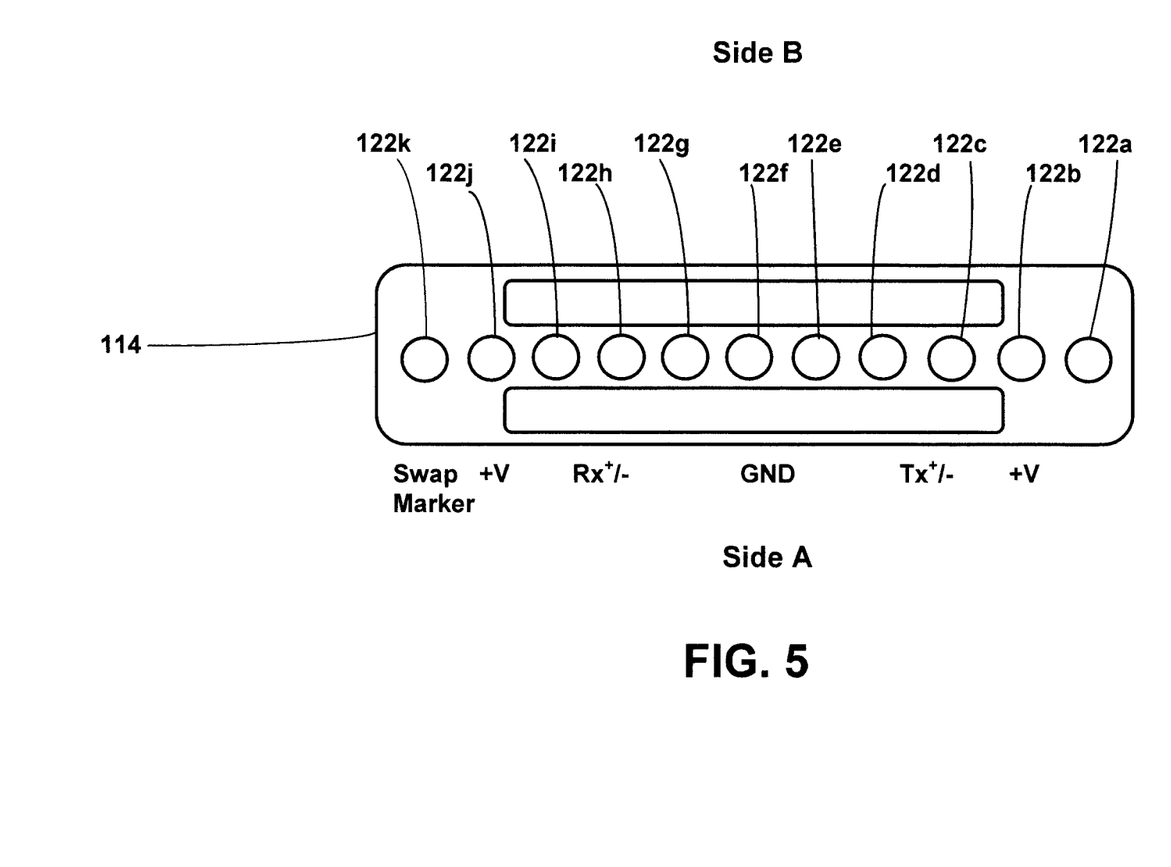
FIG. 5 depicts a plug in a second orientation according to an embodiment.

In an embodiment, the swap marker contact 122k is connected to one or more of the ground contacts 122e, 122f, or 122g. Thus, the swap marker contact 122k may comprise a voltage of the ground contacts 122e, 122f, or 122g. In another embodiment, the swap marker contact is connected to one or more of the voltage contacts 122b or 122j. Thus, the swap marker contact 122k may comprise a voltage of the voltage contacts 122b or 122j.

Figure 6:
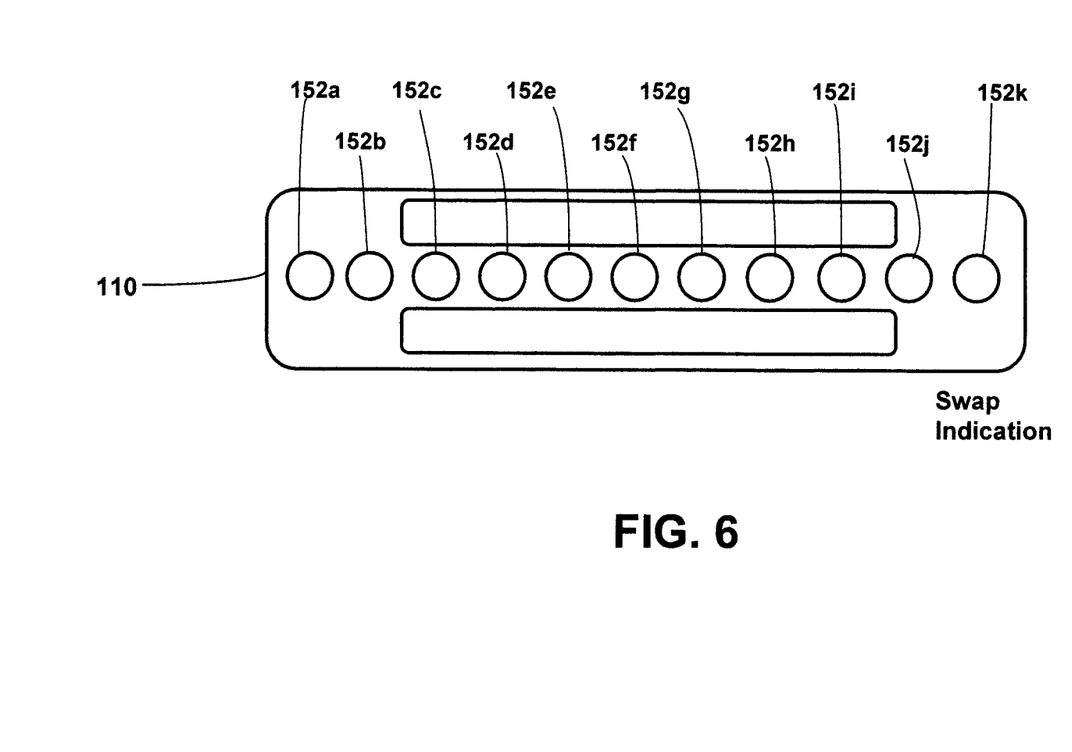
FIG. 6 depicts a receptacle according to an embodiment.

In an embodiment, the receptacle 110 is shown in more detail in FIG. 6. As can be seen in FIG. 6, the receptacle 110 comprises the set of receptacle contacts 152 as shown by the indications 152a-152k. In an embodiment, the set of receptacle contacts 152 comprises a swap indication contact 152k.

In an embodiment, the swap indication contact 152k is configured to be connected to the swap marker contact 122k or the unused contact 122a (FIGS. 4 and 5). In an embodiment, when the swap marker contact 122k is connected to the swap indication contact 152k, this indicates to the swap logic unit 108 that the plug 114 and the set of plug contacts 122 are in the first orientation. However, in an embodiment, when the swap marker contact 122k is not connected to the swap indication contact 152k, the unused contact 122a is connected to the swap indication contact 152k, which indicates that the plug 114 and the set of plug contacts 122 are in the second orientation.

Referring back to the embodiment shown in FIG. 3, the swap logic unit 108 comprises a multiplexor 120 or other control circuitry (e.g., a microcontroller), and electrical lines 130, 132, and 142. In an embodiment, the control circuitry comprises a switch unit. In an embodiment, the electrical line 130 is configured to be connected to the contact 152a in the receptacle 110. The contact 152a is configured to be connected to the unused contact 122a or the swap marker contact 122k in the plug 114. In an embodiment, the electrical line 132 is configured to be connected to the contacts 152e-152g in the receptacle 110. The contacts 152e-152g are configured to be connected to the ground contacts 122e-122g in the plug 114.

In an embodiment, the electrical line 142 is configured to be connected to the swap indication contact 152k. In an embodiment, the electrical line 142 carries a swap signal to the multiplexor 120. In an embodiment, the swap signal comprises a voltage of the swap indication contact 152k.

In an embodiment, the multiplexor 120 comprises a set of outputs such as the outputs 134, 136, 138, and 140. The multiplexor 120 also comprises inputs 144, 146, 148, and 150. The inputs 144, 146 are configured to transmit or carry the transmit signals from circuitry within the target device 104 to the host device 102. The inputs 148 and 150 are configured to receive or carry the receive signals from the host device 102 to the target device 104. In some embodiments, a microcontroller or other control circuitry can be used instead of the multiplexor 120 to provide similar functionality.

In an embodiment, the transmit signals and the receive signals are Peripheral Component Interconnect Express ("PCIe") signals, serial advanced technology attachment ("SATA") signals, universal serial bus ("USB"), high speed protocol signals, or other types of signals which may be used for communicating between the host device and the electronic device. In an embodiment, the high speed protocol signals comprise Thunderbolt signals. In an embodiment, the host plug comprises a USB plug or other types of plugs capable of sending and receiving the transmit signals and the receive signals.

In an embodiment, the outputs 134 and 136 are configured to be connected to the contacts 152c and 152d in the receptacle 110 (FIG. 6), while the outputs 138 and 140 are configured to be connected to the contacts 152h and 152i in the receptacle 110 (FIG. 6). In an embodiment, the contacts 152c and 152d can be configured to be connected to the transmit signal contacts 122c and 122d in the plug 114 (FIGS. 4 and 5) or the receive signal contacts 122h and 122i in the plug 114 (FIGS. 4 and 5) depending on whether the plug 114 is in the first orientation or the second orientation. Similarly, the contacts 152h and 152i (FIG. 6) can be configured to be connected to the receive signal contacts 122h and 122i in the plug 114 (FIGS. 4 and 5) or the transmit signal contacts 122c and 122 in the plug 114 (FIGS. 4 and 5) depending on whether the plug 114 is in the first orientation or the second orientation.

Thus, the multiplexor 120 can set of outputs in the first configuration or the second configuration based on the swap signal. In an embodiment, the first configuration corresponds to the first orientation of the plug 114 and the second configuration corresponds to the second orientation of the plug 114.

In an embodiment, depending on the orientation of the plug 114 and the set of plug contacts 122, outputs in the set of outputs corresponding to the transmit signals may be swapped with the outputs in the set of outputs corresponding to the receive signals. In an embodiment, this can ensure that the transmit signals are sent to the transmit signal contacts 122c and 122d in the plug 114 and that the receive signals are received from the receive signal contacts 122h and 122i in the plug 114, regardless of the orientation of the plug 114.

Furthermore, this can ensure that the transmit signals and the receive signals are sent with the correct polarities to the transmit signal contacts 122c and 122d and the receive signal contacts 122h and 122i regardless of the orientation of the plug 114. In an embodiment, this allows a user to plug the plug 114 into the target device 104 without worrying about an orientation of the plug 114. This can reduce an amount of time utilized to plug the plug 114 into the target device 104.

As previously noted, in an embodiment, the swap indication contact 152k is configured to be connected to the swap marker contact 122k or the unused contact 122a. In an embodiment, when the swap marker contact 122k is connected to the swap indication contact 152k, this indicates to the multiplexor 120 that the plug 114 and the set of plug contacts 122 are in the first orientation. In an embodiment, when the multiplexor 120 receives an indication that the plug 114 and the set of plug contacts 122 are in the first orientation, the multiplexor 120 configures the set of outputs 134-140 to the set of receptacle contacts 152 in a first configuration.

For example, in the first configuration, the outputs 134 and 136 can carry the transmit signals and be connected to the inputs 144 and 146 while the outputs 138 and 140 can carry the receive signals and be connected to the inputs 148 and 150. Thus, the transmit signals will be carried on the inputs 144 and 146 in the multiplexor 120, the outputs 134 and 136 in the multiplexor 120, the contacts 152c and 152d in the receptacle 110 (FIG. 6), and the transmit signal contacts 122c and 122d in the plug 114 (FIG. 4). Furthermore, the receive signals will be carried on the inputs 148 and 150 in the multiplexor 120, the outputs 138 and 140 in the multiplexor 120, the contacts 152h and 152i in the receptacle 110 (FIG. 6), and the receive signal contacts 122h and 122i in the plug 114 (FIG. 4).

However, in an embodiment, when the swap marker contact 122k is not connected to the swap indication contact 152k, the unused contact 122a is connected to the swap indication contact 152k, which indicates that the plug 114 and the set of plug contacts 122 are in the second orientation. In an embodiment, when the multiplexor 120 receives an indication that the plug 114 and the set of plug contacts 122 are in the second orientation, the multiplexor 120 configures the set of outputs 134-140 to the set of receptacle contacts 152 in a second configuration different than the first configuration.

For example, in the second configuration, the outputs 134 and 136 can carry the receive signals and be connected to the inputs 148 and 150 while the outputs 138 and 140 can carry the transmit signals and be connected to the inputs 144 and 146. Thus, the transmit signals will be carried on the inputs 144 and 146 in the multiplexor 120, the outputs 138 and 140 in the multiplexor 120, the contacts 152h and 152i in the receptacle 110 (FIG. 6), and the transmit signal contacts 122c and 122d in the plug 114 (FIG. 5). Furthermore, the receive signals will be carried on the inputs 148 and 150 in the multiplexor 120, the outputs 134 and 136 in the multiplexor 120, the contacts 152c and 152d in the receptacle 110 (FIG. 6), and the receive signal contacts 122h and 122i in the plug 114 (FIG. 5).

In an embodiment, when the swap marker contact 122k in the plug 114 is connected to the swap indication contact 152k in the receptacle 110, the swap indication contact 152k comprises a first voltage which is the same as a voltage of the swap marker contact 122k. As previously noted, the swap marker contact 152k can be connected to either one or more of the ground contacts 122e-122g or the voltage contacts 122b or 122j. Thus, if the swap marker contact 152k is connected to one or more of the ground contacts 122e-122g, the first voltage is a voltage of one or more of the ground contacts 122e-122g. However, if the swap marker contact 122k is connected to the one or more voltage contacts 122b or 122j, the first voltage is a voltage of the one or more voltage contacts 122b or 122j.

In an embodiment, the order of signals for the outputs 134-140 in the first configuration is reversed relative to an order of signals for the outputs 134-140 in the second configuration.

In an embodiment, when the swap marker contact 122k in the plug 114 is not connected to the swap indication contact 152k in the receptacle 110, the swap indication contact 152k comprises a second voltage different than the first voltage since the swap indication contact 152k will be connected to the unused contact 122a. As previously noted, the swap signal carried in the electrical line 142 comprises a voltage of the swap indication contact 152k. Therefore, in an embodiment, the voltage of the swap indication contact 152k provides an indication to the multiplexor 120 and the swap logic unit 108 as to whether the plug 114 and the set of plug contacts 122 are in the first orientation or the second orientation. Thus, in an embodiment, the multiplexor 120 and the swap logic unit 108 are configured to set the outputs 134-140 to the set of receptacle contacts 152 in the receptacle 110 based on a voltage level of the swap indication contact 152k.

In an embodiment, by utilizing the voltage of the swap indication contact 152k, the swap logic unit 108 and/or the multiplexor 120 does not need to send a signal or command to the host device 102 and wait for the response to the signal or command in order to determine the orientation of the plug 114. In an embodiment, this can reduce a manufacturing cost of the cable unit 106 and/or the swap logic unit 108.

In an embodiment, the swap logic unit 108 is configured to utilize a delayed linking. In an embodiment, during the delayed linking, the multiplexor enters a high impedance mode. That is the transmit signals and the receive signals are not sent or received immediately after the swap logic unit 108 determines that the plug 114 is initially connected to the receptacle 110. Instead, the transmit signals and the receive signals are delayed by the swap logic unit 108.

In an embodiment, the delay of the transmit signals and the receive signals is accomplished by the swap logic unit 108 through an extended reset and the reception of a high impedance mode signal by the multiplexor 120 on a high impedance mode signal line 154. When the multiplexor 120 receives the high impedance mode signal, the multiplexor 120 enters the high impedance mode, which allows for delayed enumeration of the transmit signals and the receive signals.

In an embodiment, during the high impedance mode, the multiplexor 120 prevents the outputs 134-140 from transmitting or receiving signals. In an embodiment, this also allows for settling of the outputs 134-140 to the set of receptacle contacts 152 in the receptacle 110. In an embodiment, this can prevent errors where transmit signals and receive signals are erroneously carried on the wrong outputs 134-140 due to potential confusion or ambiguity of signals which may occur when the plug 114 is initially connected to the receptacle 110.

Figure 7:
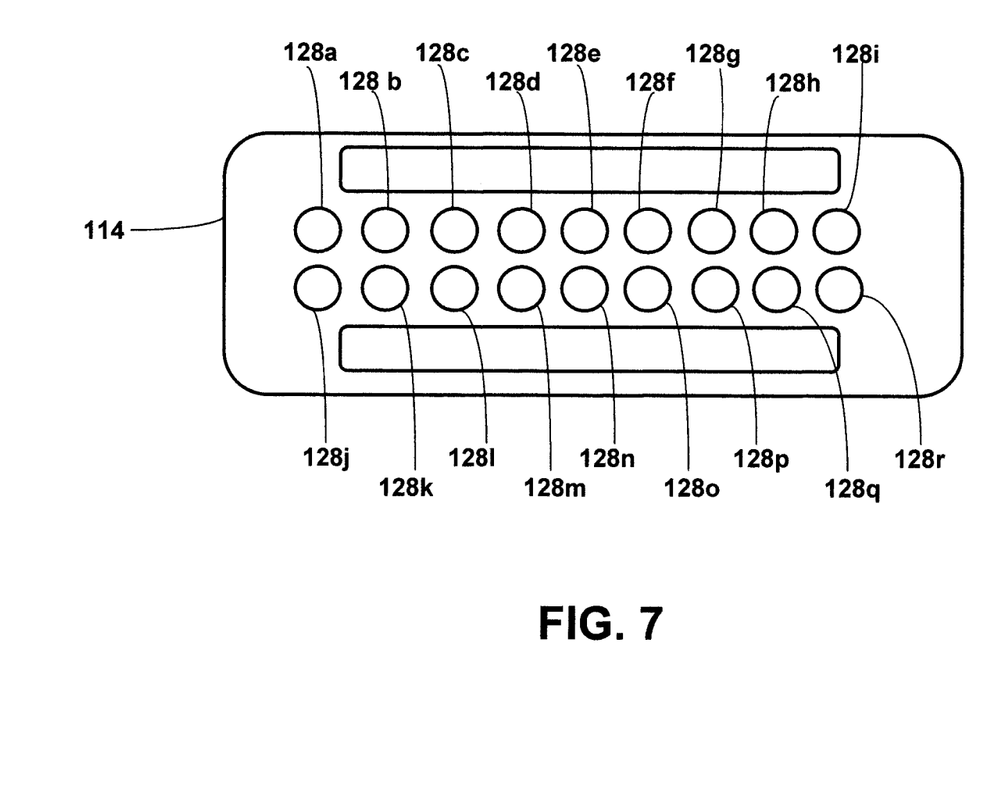
FIG. 7 depicts a plug according to an embodiment.

In an embodiment shown in FIG. 7, the plug 114 in the cable unit 106 comprises a reversible plug. In an embodiment, the plug 114 comprises a set of contacts 128 instead of the set of plug contacts 122, wherein the set of contacts 128 comprise rotational symmetry. The rotational symmetry can comprise, for example, 2-fold rotational symmetry.

In the embodiment shown in FIG. 7, the set of contacts 128 comprise a first row of contacts and second row of contacts below the first row of contacts in a first orientation. In an embodiment, from left to right, the first row of contacts comprise a voltage contact 128a, a negative receive signal contact 128b, a negative transmit signal contact 128c, three ground contacts 128d-128f, a positive transmit signal contact 128g, a positive receive signal contact 128h, and a voltage contact 128i in the first orientation. In an embodiment, from left to right, the second row of contacts comprise a voltage contact 128j, a positive receive signal contact 128k, a positive transmit signal contact 128l, three ground contacts 128m-128o, a negative transmit signal contact 128*p*, a negative receive signal contact 128*q*, and a voltage contact 128*r* in the first orientation.

In an embodiment, when plug 114 and the set of contacts 128 are rotated by 180° such that the set of contacts 128 are in the second orientation, the second row of contacts is above the first row of contacts. In an embodiment, the order of the contacts in the second row of contacts in the second orientation is the same as the order of the contacts in the first row of contacts in the first orientation. Similarly, the order of the contacts in the first row of contacts in the second orientation is the same as the order of the contacts in the second row of contacts in the first orientation.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A swap logic unit comprising:
    a set of outputs configured to be in a first configuration or a second configuration that is different than the first configuration; and
    control circuitry configured to:
        connect to a single swap indication contact of a receptacle configured to receive a reversible plug of a cable unit and determine a voltage at the single swap indication contact, wherein:
            in a first orientation, the single swap indication contact connects to a swap marker contact on the reversible plug and receives a first voltage that is indicative of the first orientation of the reversible plug of the cable unit;
            in a second orientation, the single swap indication contact connects to a different contact on the reversible plug and receives a second voltage that is different than the first voltage and that is indicative of the second orientation of the reversible plug; and
            both the first orientation and second orientation of the reversible plug are determinable using only the voltage at the single swap indication contact; and
        configure the set of outputs in the first configuration in response to determining that the single swap indication contact is at the first voltage and configure the set of outputs in the second configuration in response to determining that the single swap indication contact is at the second voltage, wherein the first configuration corresponds to the first orientation of the reversible plug and the second configuration corresponds to the second orientation of the reversible plug.

2. The swap logic unit of claim 1 wherein the second orientation is rotated by 180° relative to the first orientation.

3. The swap logic unit of claim 1 wherein the set of outputs are configured to transmit a receive signal and a transmit signal.

4. The swap logic unit of claim 3 wherein a location of an output for the receive signal relative to a location of an output for the transmit signal in the set of outputs in the first configuration is different than the location of the output for the receive signal relative to the location of the output for the transmit signal in the set of outputs in the second configuration.

5. The swap logic unit of claim 1 wherein the single swap indication contact is configured to connect to a swap marker contact in the reversible plug.

6. The swap logic unit of claim 5 wherein the first voltage is a voltage of the swap marker contact.

7. The swap logic unit of claim 1 wherein an order of signals carried by the set of outputs in the first configuration is reversed relative to an order of signals carried by the set of outputs in the second configuration.

8. The swap logic unit of claim 1 wherein:
    the control circuitry is located in a target device;
    the control circuitry is further configured to enter a high impedance mode in response to determining that the reversible plug is initially connected to the target device; and
    the high impedance mode prevents at least some outputs in the set of outputs from transmitting or receiving signals while the reversible plug is connected to the receptacle.

9. An electronic device comprising:
    a receptacle configured to be connected to a reversible plug of a cable unit;
    a first set of contacts located in the receptacle and configured to be connected to a second set of contacts located in the reversible plug, wherein:
        the first set of contacts comprises a single swap indication contact;

in a first orientation, the single swap indication contact connects to a swap marker contact on the reversible plug and receives a first voltage that is indicative of the first orientation of the reversible plug;

in a second orientation, the single swap indication contact connects to a different contact on the reversible plug and receives a second voltage that is different than the first voltage and that is indicative of the second orientation of the reversible plug; and both the first orientation and the second orientation of the reversible plug are determinable using voltages received at the single swap indication contact only; and a swap logic unit comprising:
a set of outputs configured to be in a first configuration or a second configuration, and be connected to the first set of contacts; and
control circuitry configured to:
connect to the single swap indication contact; and
configure the set of outputs in the first configuration in response to determining that the single swap indication contact is at the first voltage and configure the set of outputs in the second configuration in response to determining that the single swap indication contact is at the second voltage, wherein the first configuration corresponds to the first orientation of the reversible plug and the second configuration corresponds to the second orientation of the reversible plug.

10. The electronic device of claim 9 wherein the second orientation is rotated by 180° relative to the first orientation.

11. The electronic device of claim 9 wherein a location of an output for a receive signal relative to a location of an output for a transmit signal in the set of outputs in the first configuration is different than the location of the output for the receive signal relative to the location of the output for the transmit signal in the set of outputs in the second configuration.

12. The electronic device of claim 9 wherein the single swap indication contact is configured to connect to a swap marker contact in the reversible plug.

13. The electronic device of claim 9 wherein the receptacle comprises a first magnetic element configured to cooperate with a second magnetic element in the reversible plug to secure the receptacle with the reversible plug.

14. The electronic device of claim 9 wherein an order of signals for the set of outputs in the first configuration is reversed relative to an order of signals for the set of outputs in the second configuration.

15. A cable unit comprising:
a reversible plug configured to be connected to a target device, and be in a first orientation or a second orientation; and
a first set of contacts located in the reversible plug and configured to be connected to a second set of contacts located in the target device;
wherein:
the first set of contacts comprises a voltage contact, a ground contact, and a single swap marker contact connected to the voltage contact or the ground contact, and the second set of contacts comprises a single swap indication contact;
in the first orientation, the single swap marker contact is configured to contact the single swap indication contact and receive a first voltage that is indicative of the reversible plug being in the first orientation; and in the second orientation, the single swap indication is configured to not contact the single swap indication contact and receive a second voltage that is indicative of the reversible plug being in the second orientation;

the single swap indication contact is configured to indicate when to reverse an order of signals for the second set of contacts from a first order of signals in the first orientation to a second order of signals in the second orientation; and both the first orientation and the second orientation of the reversible plug are determinable using voltages received at the single swap indication contact only.

16. The cable unit of claim 15 wherein the second orientation is rotated by 180° relative to the first orientation.

17. The cable unit of claim 15 wherein the reversible plug comprises a first magnetic element configured to cooperate with a second magnetic element in a receptacle in the target device to secure the reversible plug with the receptacle.

18. The cable unit of claim 17 wherein the first magnetic element is connected to the ground contact.

19. A cable unit comprising:
a reversible plug configured to be connected to a target device in either a first orientation or a second orientation that is rotated by 180 degrees relative to the first orientation, the reversible plug comprising:
a first side;
a second side opposite the first side; and
a set of contacts comprising:
a first row of contacts extending from the first side to the second side, the first row of contacts comprising, from the first side to the second side, a first voltage contact, followed by a first negative receive contact, followed by a first negative transmit contact, followed by at least one first ground contact, followed by a first positive transmit contact, followed by a first positive receive contact, and followed by a second voltage contact; and
a second row of contacts extending from the first side to the second side in parallel with the first row of contacts, the second row of contacts comprising, from the first side to the second side, a third voltage contact, followed by a second positive receive contact, followed by a second positive transmit contact, followed by at least one second ground contact, followed by a second negative transmit contact, followed by a second negative receive contact, and followed by a fourth voltage contact;
wherein the set of contacts comprise rotational symmetry such that an order of the contacts in the second row of contacts in the second orientation is the same as an order of the contacts in the first row of contacts in the first orientation and such that the order of the contacts in the first row of contacts in the second orientation is the same as the order of the contacts in the second row of contacts in the first orientation.

20. The cable unit of claim 19 wherein the set of contacts comprise 2-fold rotational symmetry.

21. The cable unit of claim 19 wherein an order of contacts in the first row of contacts from the first side to the second side is the reverse of an order of contacts in the second row of contacts from the first side to the second side.

22. The cable unit of claim 19 wherein an order of contacts in the first row of contacts from the first side to the second side is a same as an order of contacts in the second row of contacts from the second side to the first side.

23. The cable unit of claim 19 wherein the reversible plug comprises a first magnetic element configured to cooperate with a second magnetic element in a receptacle in the target device to secure the reversible plug with the receptacle.

\* \* \* \* \*